United States Patent
Goel

(10) Patent No.: US 7,099,591 B2
(45) Date of Patent: Aug. 29, 2006

(54) INTEGRATED WAVELENGTH DIVISION MULTIPLEXED RECEIVER ARRAY HAVING PLUGGABLE TRANSMITTERS

(75) Inventor: Vibha Goel, Saratoga, CA (US)

(73) Assignee: Avanex Corp., Fremont, CA (US)

( * ) Notice: Subject to any disclaimer, the term of this patent is extended or adjusted under 35 U.S.C. 154(b) by 47 days.

(21) Appl. No.: 10/796,835

(22) Filed: Mar. 8, 2004

(65) Prior Publication Data

US 2004/0175185 A1 Sep. 9, 2004

Related U.S. Application Data

(62) Division of application No. 10/150,515, filed on May 17, 2002, now Pat. No. 6,704,520.

(60) Provisional application No. 60/292,187, filed on May 18, 2001.

(51) Int. Cl.
*H04B 10/00* (2006.01)

(52) U.S. Cl. .................. 398/138; 385/75; 385/24; 398/181; 359/882

(58) Field of Classification Search ............ 385/75, 385/24; 359/882; 398/181, 138
See application file for complete search history.

(56) References Cited

U.S. PATENT DOCUMENTS

| 5,757,998 A | * | 5/1998 | Thatcher et al. ............ 385/75 |
| 6,014,479 A | * | 1/2000 | Darcie ....................... 385/24 |
| 6,069,752 A | * | 5/2000 | Harrigan et al. ........... 359/822 |
| 2002/0181509 A1 | * | 12/2002 | Mody et al. .............. 370/480 |

* cited by examiner

*Primary Examiner*—David C. Payne
(74) *Attorney, Agent, or Firm*—Patterson & Sheridan, LLP

(57) ABSTRACT

A housing that includes separated and removable transmitter modules, and common receiver circuitry. The receiver is common to all modules, but the modules can be removed and replaced to allow different frequencies and the like. Each module also includes its own heat handling mechanism such as a heat sink.

5 Claims, 2 Drawing Sheets

INTEGRATED WAVELENGTH DIVISION MULTIPLEXED RECEIVER ARRAY HAVING PLUGGABLE TRANSMITTERS

CROSS-REFERENCE TO RELATED APPLICATIONS

This is a divisional of application(s) Ser. No. 10/150,515 filed on May 17, 2002, now U.S. Pat. No. 6,704,520, which claims priority from provisional application No. 60/292,187, filed May 18, 2001.

BACKGROUND

Wavelength division multiplexed hardware can operate multiple different formats. However, it may be difficult to determine in advance which kinds of hardware are necessary for different applications. For example, WDM applications may benefit from scalable transponders. These transponders may operate according to multiple formats. They may operate at different wavelengths, and different wavelength spacings.

SUMMARY

The present application teaches a special module in which a WDM receiver array with pluggable transmitters is formed. The module enables multiple different transmitter modules to be selectively used and substituted for any others. Any of those may be added or substituted. A single transponder solution may be used for all of the modules.

BRIEF DESCRIPTION OF THE DRAWINGS

These and other aspects will now be described in detail with reference to the accompanying drawings, wherein.

DETAILED DESCRIPTION

Figure 1:
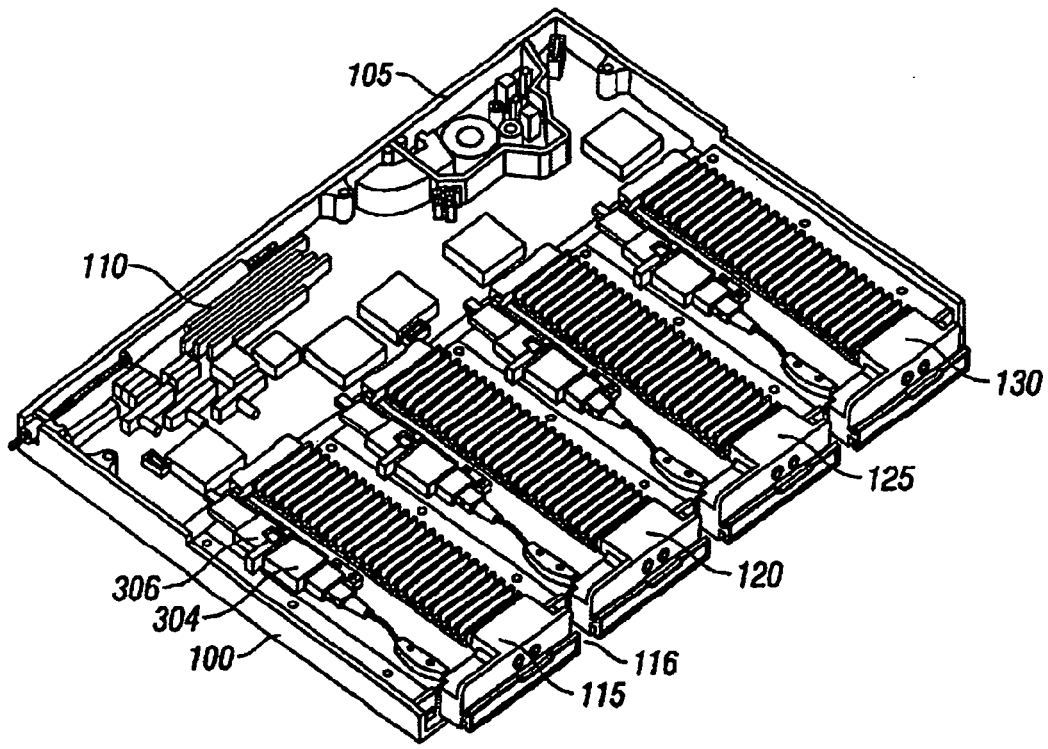
FIG. 1 shows a diagram of a module has assembled to include a plurality of transmitter modules.

An embodiment is shown in FIG. 1. FIG. 1 shows the basic chassis 100 which may store between 1 and 4 transmitter modules or other modules. A wave locker 105 may be common to the entire chassis assembly. The assembly may also include receiver components 110 such as a receiver array and couplers. A plurality of slide in WDM transceiver modules 115, 120, 125, 130 are shown. The system may operate with one or more of these devices.

Figure 2:
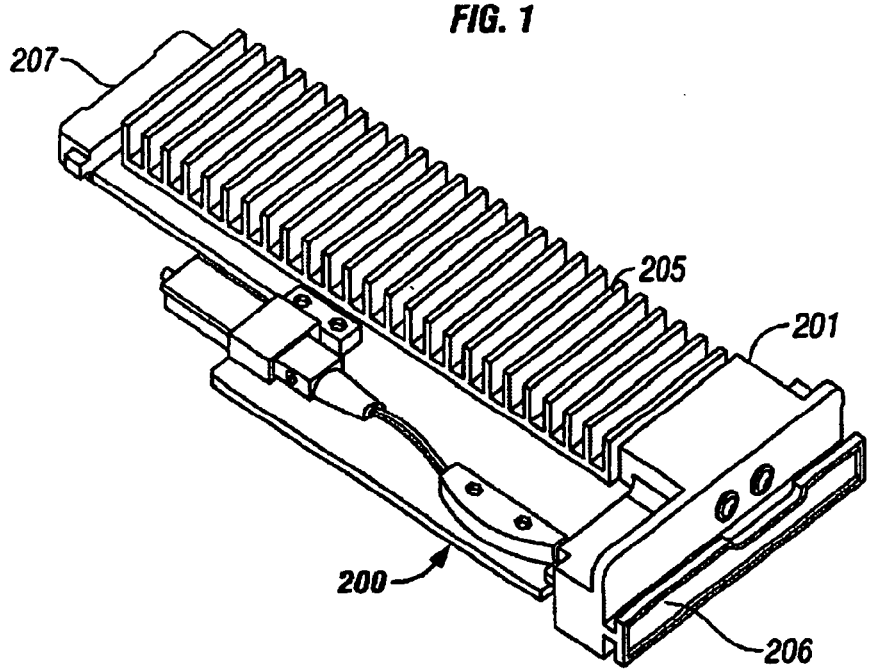
FIG. 2 shows a top view of the transmitter modules.
Figure 3:
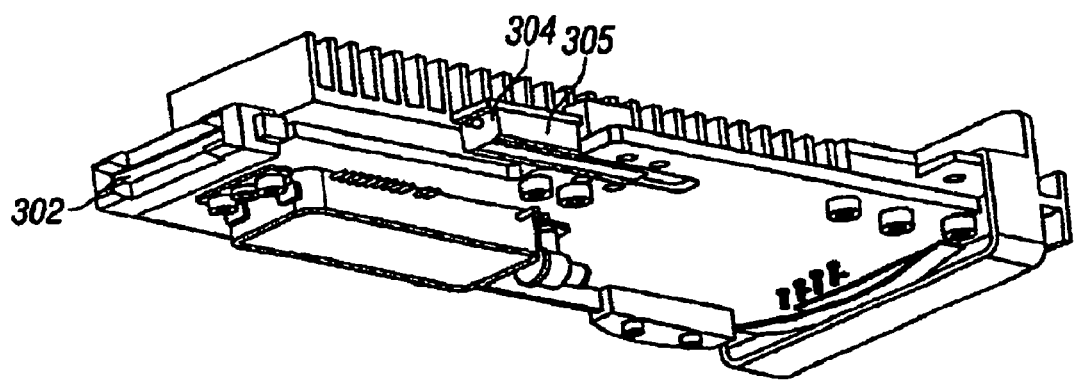
FIG. 3 shows a bottom view of the transmitter modules.

The specific transmitter assembly is shown in FIG. 2. Each transmitter assembly 200 includes a self-contained casing 201. The casing includes a front interface portion 206 as well as a rear connection portion 207. The connection portion 207 may include connector elements which enable connection to receive power and signals from the common components within the housing 100. A heat sink part 205 may be associated with the transmitter module to dissipate the heat produced thereby. The device may also include a connector part 302 as well as orientation and slide assembly 304. The slide assembly 304 may include surfaces such as 305 which maintain the proper registration of the module 200 so that it may align properly and slide properly into the receiving connector on the board. For example, FIG. 1 shows the slide and interface assembly 304 being connected into a corresponding mating connector 306 on the board. This may have the effect of holding the interface assembly in its connected location.

Significant advantages may be obtained from the system. The receiver may be associated with multiple changeable transmitters. One or more changeable transmitters may be used. The system may have significant scalability. For example, the operation may start with one wavelength, and build on that to add other wavelengths and/or other types or schemes of transmission. Inventory management may also be simplified, since many different types of transmission may be contained in the different devices. In addition, since the modules may be easily replaceable, submodule failure may be easily cured by carrying spares. In addition, since each of the different transmitters are physically separated, and contains its own heat sink (heat management part) any overheating caused to one module is not necessarily transmitted to the other modules. FIG. 1 shows a small space 116 being left between the modules 115, 120. In this way, a single module overheating might not cause failure of the entire assembly.

Figure 4:
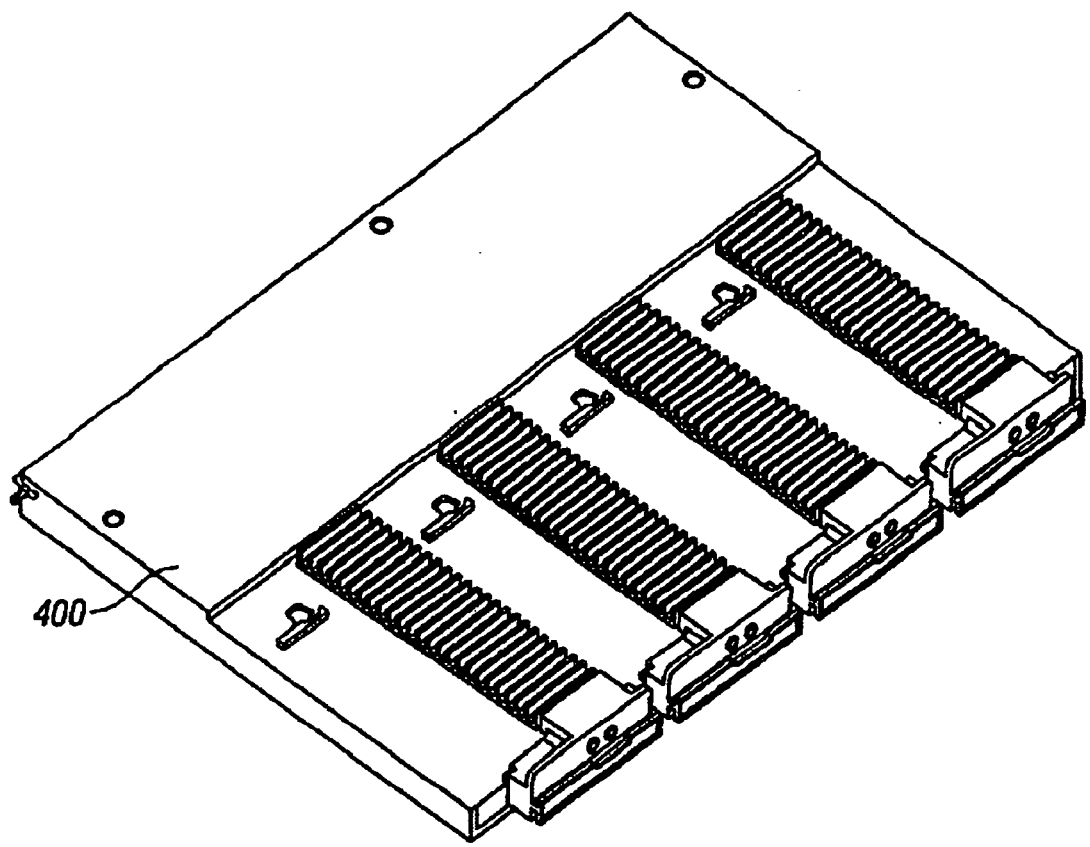
FIG. 4 shows an assembled transmitter module including a cover over the receiver parts.

FIG. 4 shows the entire module with a cover 400 covering the receiver assembly portions 105, 110. This cover may be detachable to expose the underlying modules for removal.

What is claimed is:

1. A system, comprising:
a housing;
a common receiver part for receiving signals, associated with said housing, including at least a receiver array,
a plurality of interface assemblies, each interface assembly sized for receiving a transmitter part which have outer surfaces sized for allowing said transmitter part to slide into place within said housing, and which can be selectively inserted and removed from said receiver part, said housing including common circuitry operating to drive said interface assemblies, and said housing including slide portions which guide said surfaces of each interface assembly into a location and allow connection to said interface assembly, and which allow said interface assemblies to be selectively slid into place and connected and subsequently removed, each said interface assembly including its own heat sink portions, associated with transmitter circuitry on the interface assembly, which operate to dissipate heat from the interface assembly.

2. A system as in claim 1, wherein said plurality of interface assemblies are wavelength division multiplexed transmitters.

3. A system as in claim 2, wherein said transmitters may transmit at different frequencies.

4. A system as in claim 1, wherein said common receiver part includes receiver driving circuitry.

5. A system as in claim 1, wherein said interface assemblies include transmitters including a first transmitter which transmits at a first frequency, and a second transmitter which transmits at a second frequency.

* * * * *